United States Patent
Jacobsen

(10) Patent No.: US 10,911,089 B2
(45) Date of Patent: Feb. 2, 2021

(54) MOBILE DEVICE CASE

(71) Applicant: Kopin Corporation, Westborough, MA (US)

(72) Inventor: Jeffrey J. Jacobsen, Hollister, CA (US)

(73) Assignee: KOPIN CORPORATION, Westborough, MA (US)

(*) Notice: Subject to any disclaimer, the term of this patent is extended or adjusted under 35 U.S.C. 154(b) by 0 days.

(21) Appl. No.: 15/661,506

(22) Filed: Jul. 27, 2017

(65) Prior Publication Data
US 2018/0034496 A1 Feb. 1, 2018

Related U.S. Application Data

(60) Provisional application No. 62/368,410, filed on Jul. 29, 2016.

(51) Int. Cl.
*H04M 1/00* (2006.01)
*H04B 1/3888* (2015.01)
(Continued)

(52) U.S. Cl.
CPC ............ *H04B 1/3888* (2013.01); *A45C 11/00* (2013.01); *G06F 1/1626* (2013.01);
(Continued)

(58) Field of Classification Search
CPC ...... G06F 1/181; G06F 1/1626; G06F 1/1628; G06F 1/1656; G06F 2200/1633;
(Continued)

(56) References Cited

U.S. PATENT DOCUMENTS

| 6,534,715 B1* | 3/2003 | Maunder | ............... H01B 7/184 |
| | | | 174/110 R |
| 2002/0193136 A1* | 12/2002 | Halkosaari | .......... H04M 1/0283 |
| | | | 455/550.1 |

(Continued)

FOREIGN PATENT DOCUMENTS

| WO | 2014130862 | 8/2014 |
| WO | 2018022869 | 1/2018 |

OTHER PUBLICATIONS

Invitation to Pay Additional Fees dated Oct. 10, 2017 for PCT/US2017/044154 entitled "Mobile Device Case".
(Continued)

*Primary Examiner* — Nhan T Le
(74) *Attorney, Agent, or Firm* — Hamilton, Brook, Smith & Reynolds, P.C.

(57) ABSTRACT

A mobile device case may include a housing having a main body with a display opening, and a cap. The cap may be fixedly attachable to the main body so that when the cap is fixedly attached to the main body a housing interior is environmentally isolated from a housing exterior. The housing may further include a feedthrough connector assembly including an interior connector disposed within the housing, and an exterior connector electrically connected to the interior connector and disposed outside of the housing, the feedthrough connector assembly configured to environmentally isolate the housing interior from the housing exterior. The mobile device case may further include a selectably sealable environmental port configured to selectably allow a gas flow from the housing interior to the housing exterior, allow a gas flow from the housing exterior to the housing interior, and maintain a seal between the housing exterior and the housing interior.

6 Claims, 5 Drawing Sheets

(51) Int. Cl.
  *G06F 1/16* (2006.01)
  *H04M 1/18* (2006.01)
  *A45C 11/00* (2006.01)

(52) U.S. Cl.
  CPC .......... *G06F 1/1628* (2013.01); *G06F 1/1656* (2013.01); *H04M 1/18* (2013.01); *H04M 1/185* (2013.01); *A45C 2011/002* (2013.01); *G06F 2200/1633* (2013.01); *H04M 2250/12* (2013.01)

(58) Field of Classification Search
  CPC . A45C 11/00; A45C 2011/002; H04B 1/3888; H04M 1/18; H04M 1/185; H04M 2250/12
  See application file for complete search history.

(56) References Cited

U.S. PATENT DOCUMENTS

| | | | | |
|---|---|---|---|---|
| 2010/0226509 | A1* | 9/2010 | Filson | G06F 1/1656 381/105 |
| 2012/0031786 | A1 | 2/2012 | Mish | |
| 2012/0113209 | A1* | 5/2012 | Ritchey | H04N 5/2254 348/14.02 |
| 2013/0032201 | A1 | 2/2013 | Oomae et al. | |
| 2013/0322013 | A1* | 12/2013 | Steele | A45C 11/00 361/679.55 |
| 2015/0319520 | A1* | 11/2015 | Richardson | G06F 1/1626 381/384 |
| 2017/0108894 | A1* | 4/2017 | Tannous | G06F 1/1628 |
| 2017/0192923 | A1* | 7/2017 | Liu | G06F 13/385 |

OTHER PUBLICATIONS

International Search Report and Written Opinion for PCT/US2017/044154 dated Dec. 4, 2017 entitled "Mobile Device Case".

International Preliminary Report on Patentability for PCT/US2017/044154 dated Jan. 29, 2019 entitled "Mobile Device Case".

* cited by examiner

MOBILE DEVICE CASE

RELATED APPLICATION

This claims the benefit of U.S. Provisional Application No. 62/368,410, filed on Jul. 29, 2016. The entire teachings of the above application are incorporated herein by reference.

BACKGROUND

Mobile devices may be required to operate in adverse environments including, but not limited to, caustic environments, toxic environments, explosive environments, biohazard environments, extreme temperature environments, high shock and vibration environments, and severe weather environments.

To handle such adverse conditions, a mobile device may be enclosed in a protective case. While a particular case design may provide protection in some environments, that same case may be susceptible to other environments. For example, a case made to provide protection in severe weather environments may not provide sufficient protection to withstand toxic or explosive environments.

Some adverse environments present issues that are unique to other environments. For example, a mobile device exposed to a toxic or biohazard environment may need to be decontaminated prior to being reused. Further, a mobile device exposed to an explosive environment needs to be incapable of producing an electrical arc that could ignite any ambient explosive gases.

SUMMARY OF THE INVENTION

A mobile device case, constructed according to the described embodiments, may provide a particular level of protection to a mobile device contained within the mobile device case. Such mobile devices may include, but are not limited to, a cellular telephone (e.g., a smartphone), a tablet or other communications/computing device.

A mobile device case constructed according to the described embodiments may provide environmental protection that can be easily replaced when the case is contaminated. For example, when a mobile device case constructed according to the described embodiments becomes contaminated with biohazard materials during a medical emergency event, the contained mobile device may be removed from the contaminated case and transferred to another clean (i.e., uncontaminated) mobile device case.

A mobile device case constructed according to the described embodiments may be used to provide protection for a mobile device to be used in an explosive environment. Although the mobile device can be redesigned and produced as a specialized version, to be safely used in an explosive environment, such a redesign can be costly and time-consuming. A mobile device case constructed according to the described embodiments may be employed to use a standard mobile device in an explosive atmosphere, when the mobile device has not itself been certified as being safe in an explosive atmosphere.

Embodiments described herein may combine the mobile device case, a mobile headset device, and communications media (e.g., a cable) to form a sealed system configured to provide protection for the sealed system operating in an explosive environment. In general, the sealed system may comprise one or more features, as described herein, that serve to prevent an electrical phenomenon (e.g., a spark or other electrical discharge) that could ignite the explosive atmosphere.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Embodiments of a mobile device case according to the invention may include a soft case 100 for a mobile device 102, as shown in the example embodiments of FIGS. 1A through 1G. The soft case 100 may consist of silicone, as shown in the example embodiments, or other suitable material for providing a soft, sealable case. The case 100 may be configured to conform to the size, shape, constituent components and constituent functionality of the particular mobile device 102.

Figure 1:
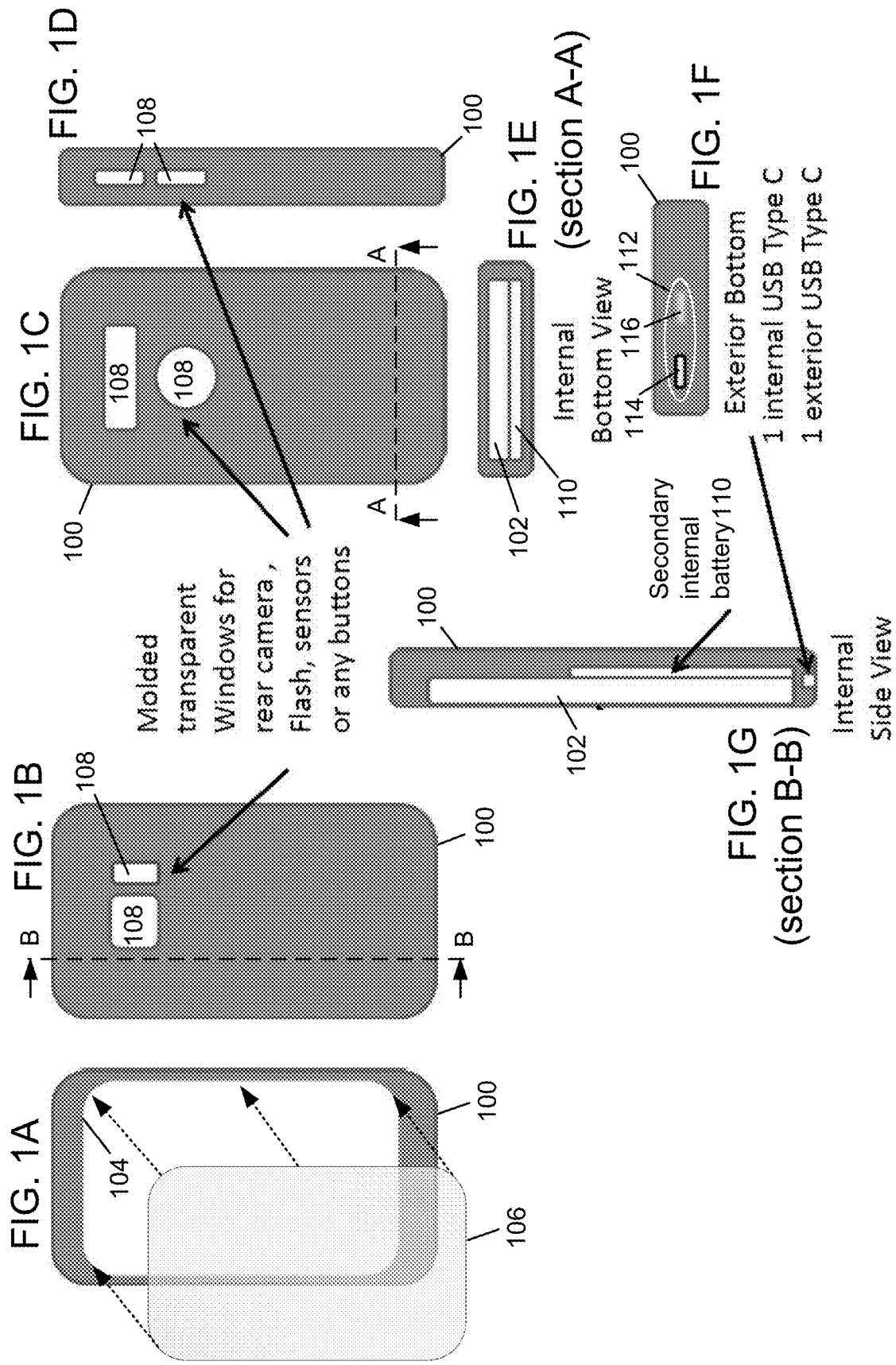
FIG. 1A shows a front view of the mobile device case according to an embodiment of the invention.
FIG. 1B shows a back view of the mobile device case according to an embodiment of the invention.
FIG. 1C shows an alternative back view of the mobile device case according to an embodiment of the invention.
FIG. 1D shows a side view of the mobile device case according to an embodiment of the invention.
FIG. 1E shows sectional view A-A with respect to FIG. 1C.
FIG. 1F is a bottom view of the mobile device case according to an embodiment of the invention.
FIG. 1G is a sectional view B-B with respect to FIG. 1B.

FIG. 1A shows a front view of the case 100. FIG. 1B shows a back view of the case 100. FIG. 1C shows an alternative back view of the case 100. FIG. 1D shows a side view of the case 100. FIG. 1E shows sectional view A-A with respect to FIG. 1C. FIG. 1F is a bottom view of the case 100. FIG. 1G is a sectional view B-B of the case 100 with respect to FIG. 1B.

A mobile device 102 may be inserted into the case 100 through the display opening 104, by stretching the silicon case 100 around the mobile device 102. Once inserted, the mobile device 102 is completely sealed except for the display opening 104. A transparent window 106, configured to allow use of a touch screen on the mobile device 102, is included in the display opening 104. In some embodiments, the transparent window 106 is created as part of the fabrication of the case 100. In other embodiments, the transparent window 106, consisting for example of plastic, glass, or quartz, is inserted into the display opening 104 and sealed in place to completely encapsulate the mobile device. Once the transparent window 106 is sealed, the internal portions of the case 100 are isolated from the environment external to the case 100.

As shown in FIGS. 1B, 1C, and 1D, the soft silicone case 100 may include one or more sealed apertures 108 associated with mobile device components such as a rear camera, camera flash, sensors, or control mechanisms (e.g., buttons, switches). The sealed apertures 108 may be rectangular, square and circular shapes as shown in the figures, or they may be other shapes to meet the functional needs of the particular mobile device components. The sealed apertures 108 may be transparent to facilitate use of the mobile device component (e.g., the camera view to the environment outside of the case 100), or so that a user may view and identify the device component (e.g., button, switch).

The case 100 may include a secondary battery 110 to supplement the power supplied to the mobile device 102 by the battery of the mobile device 100.

The case 100 may include a feed-through connector assembly 112 for electrically connecting components, located external the case 100, to the mobile device 102 contained within the case 100. The feed-through connector assembly 112 includes an external connector 114 and an internal connector 116.

The external connector 114 is embedded in a sidewall of the case 100 so that the external connector 114 is accessible from outside of the case 100. In the example of FIG. 1F, the external connector 114 is embedded in the bottom portion of the case 100, although other locations may be used. The exterior connector 114 is sealed within the sidewall of the case 100 so that the environment outside of the case 100 cannot leak through or around the external connector to the interior portions of the case. In other words, the feed-through connector assembly 112 is configured to isolate the environment outside of the case 100 from the environment inside of the case 100. The external connector 114 is configured to accept a communications cable connector, for example a USB Type C cable connector.

The interior connector 116 is also embedded into a sidewall of the case 100, although not necessarily the same sidewall as the exterior connector 114, as is shown in FIG. 1F. Interior connector 116 is configured to mate with a connector on the mobile device 102, and so is located on the case 100 based on the location of the connector on the mobile device. A set of electrical conductors (not shown) connects the external connector 114 to the internal connector 116. The set of electrical conductors conveys electrical signals, such as data signals and power, from the external connector 114 to the internal connector 116. The secondary battery 110 may be electrically connected to the internal connector 116 by splicing into the set of electrical conductors that connect the external connector 114 to the internal connector 116, or through a separate set of electrical conductors.

Another embodiment of the mobile device case is a combination hard outer body and silicone interior case 200 for a mobile device 102, as shown by the example embodiments depicted in FIGS. 2A through 2G. The case 200 may be configured to conform to the size, shape, constituent components and constituent functionality of the particular mobile device 202.

Figure 2:
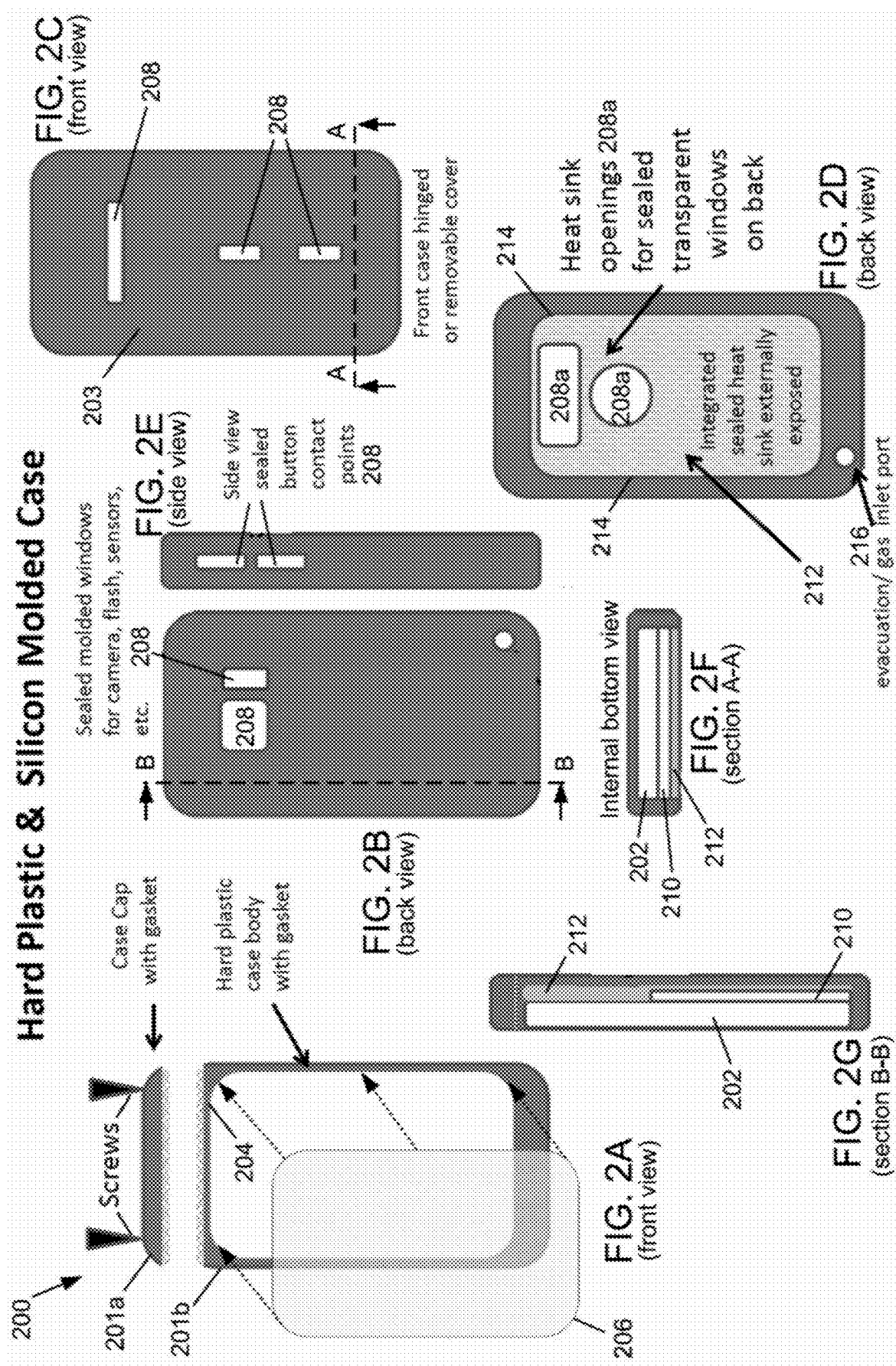
FIG. 2A shows a front view of the mobile device case according to an embodiment of the invention.
FIG. 2B shows a back view of the mobile device case according to an embodiment of the invention.
FIG. 2C shows a front view of the mobile device case according to an embodiment of the invention.
FIG. 2D shows an alternative back view of the mobile device case according to an embodiment of the invention.
FIG. 2E shows a side view of the mobile device case according to an embodiment of the invention.
FIG. 2F shows sectional view A-A with respect to FIG. 2C.
FIG. 2G is a sectional view B-B with respect to FIG. 2B.

FIG. 2A shows a front view of the case 200. FIG. 2B shows a back view of the case 200. FIG. 2C shows a front view of the case 200, including a hinged or removable cover 203 that may be used to protect the display opening 204 and the mobile device display. FIG. 2D shows an alternative back view of the case 200, including an integrated heat sink. FIG. 2E shows a side view of the case 200. FIG. 2F shows sectional view A-A with respect to FIG. 2C. FIG. 2G is a sectional view B-B of the case 200 with respect to FIG. 2B.

The case 200 includes a hard outer body portion (e.g., plastic, although other materials suitable for implementing a hard outer shell) and a soft interior portion. The hard outer portion may consist of plastic as depicted in the example embodiment, although other materials suitable for implementing a hard outer shell may also be used. The soft interior portion may consist of silicone, as depicted in the example embodiment, although other materials suitable for implementing a soft inner lining may also be used.

Referring to FIG. 2A, the case 200 includes a cap 201a that fixedly attaches to the top of the case main body 201b. In this example embodiment, two screws are used to secure the cap 201a to the main body 201b, but other types of securing mechanisms known in the art for fixedly securing components together may also be used. Further, other numbers of securing components may alternatively be used.

One or both of the cap 201a and the main body 201b may include a gasket that, when compressed between the cap 201a and the main body 201b, create a seal capable of isolating the interior of the case 200 from the environment external to the case 200. In other embodiments, the seal may be implemented by other techniques and with alternative materials, as are known in the art.

A display opening 204 may be included in the main body 201b, the display opening 204 configured to be compatible the display of the mobile device. A transparent window 206 may be included in the opening 204. In some embodiments, the transparent window 206 is created as part of the fabrication of the main body 201b. In other embodiments, the transparent window 206, consisting for example of plastic, glass, or quartz, is inserted into the display opening 204 and sealed in place with a gasket or other sealing material. The case 200 is configured such that once the transparent window 206 is sealed, and the cap 201a is secured to the main body 201b, the internal portions of the case 200 are isolated from the environment external to the case 200. The isolation may be sufficient to form an airtight boundary between the interior portion of the case 200 and the exterior environment.

As shown in FIGS. 2B, 2C, 2D and 2E, the main body 201b may comprise one or more sealed apertures 208 associated with mobile device components, such as a rear camera, camera flash, sensors, or control mechanisms (e.g., buttons, switches). The sealed apertures 208 may be rectangular, square and circular shapes as shown in the figures, or they may be other shapes to meet the functional needs of the particular mobile device components. The sealed apertures 208 may be transparent to facilitate use of certain mobile device components (e.g., the camera view to the environment outside of the case 200), or so that a user may view and identify the device component (e.g., button, switch). As shown in FIG. 2C, the front cover may include sealed apertures 208 for viewing select portions of the device display through the display opening 204.

The case 200 may include a secondary battery 210, as shown in FIGS. 2F and 2G, to supplement the power supplied by the battery of the mobile device 100 to the mobile device 102.

The main body 201b may include a feed-through connector assembly (not shown) for electrically connecting components, located external the case 200, to the mobile device 202 contained within the case 200. The feed-through connector assembly includes an external connector and an internal connector (not shown), the same as or similar to the connectors 114 and 116 shown in FIG. 1F. The external connector is configured to accept a communications cable connector, for example a USB Type C cable connector. A USB Type C cable may be used to convey data rates high enough to support transmission of raw video data and other high-rate data from a secondary mobile device (e.g., a headset device), so that the secondary mobile device does not require the processing power necessary to compress and otherwise process the raw data.

The external connector is embedded in a sidewall of the main body 201b so that the external connector is accessible from outside of the case 200. In this example embodiment, the external connector is embedded in the bottom portion of the main body 201b, although other locations may be used. The exterior connector is sealed within the sidewall of the main body 201b so that while electrical conductors may pass through the case, the environment outside of the case 200 cannot leak through or around the external connector to the interior portions of the case 200.

In some embodiments, the case 200 may include two or more external connectors. For example, one of the external connectors may be a USB Type C connector for a headset device as described above, while another external connector may be used to connect the mobile device to another device such as a bar code scanner or an infrared camera, among others.

The interior connector is also embedded into a sidewall of the case 200, although not necessarily the same sidewall as the exterior connector. The interior connector passes through the soft interior portion and is configured to mate with a connector on the mobile device 202, and so is located on the case 200 based on the location of the connector on the mobile device 202. A set of electrical conductors (not shown) connects the external connector to the internal connector. The set of electrical conductors conveys electrical signals, such as data signals and power, from the external connector to the internal connector. The secondary battery 210 may be electrically connected to the internal connector by splicing into the set of electrical conductors that connect the external connector to the internal connector, or through a separate set of electrical conductors.

The case 200 may also include an embedded heat sink 212 for conveying thermal energy from the mobile device 202 and the secondary battery 201 to the environment outside of the case 200. A heatsink opening 214 in the main body 201b allows exposure of the heatsink 212 to the exterior environment. A sealant may be applied to the edge of the heatsink opening 214 and the heatsink 212, to ensure that the interior of the case 200 remains isolated from the exterior environment. Alternatively, a gasket may be utilized between the heatsink and the edge of the heatsink opening 214 to provide the aforementioned isolation. Heatsink openings 208a may be included in the heatsink 212, corresponding to the sealed apertures 208 in the main body 201.

The case 200 may further include a gas inlet/evacuation port 216. In some embodiments, once the mobile device 202 is deployed into the main body 201b and the cap 201a is secured to the main body, a vacuum pump may be used to evacuate air from inside of the case 200 through the port 216. Once the air has been evacuated, an inert gas may be deployed into the case 200 through the port 216, until the pressure inside of the case 200 is somewhat greater than the exterior ambient pressure (i.e., creating a "positive pressure" inside of the case 200 with respect to ambient pressure of the environment outside of the case 200). In an explosive external environment, the positive pressure within the case 200 may effectively prevent explosive gases from entering the case 200.

For a mobile device 202 having altitude sensing capability based on atmospheric pressure, software (also referred to herein as computer code instructions) of the described embodiment executing on the mobile device 202 may determine, based on the sensed atmospheric pressure, that the pressure within the case has fallen below a threshold, and as a result cause the mobile device to deactivate. Such software may provide a safety measure in the event that the integrity of the case has been compromised (e.g., when a catastrophic event occurs resulting in a cracked case).

In some embodiments for which the mobile device 202 does not have altitude sensing capability, the case 200 may further comprise a pressure sensor to detect the pressure within the case, and to provide a signal, which conveys information corresponding to the pressure sensed by the pressure sensor, to the mobile device 202. Software for sensing pressure changes may be used by the mobile device to sense a drop in internal case pressure and as a result deactivate the mobile device, as described above for the altitude sensing mobile device.

In one embodiment, the software executing on the mobile device may work in conjunction with one or more accelerometers and/or gyroscopes (as part of the mobile device itself or embedded within the case 200) to detect the free fall of a mobile device in a case. In the event that the device exceed a free fall threshold, and/or the mobile device hits or deflects off of something in the ambient environment with a force or impact that exceeds an impact threshold, the software may cause the mobile device to automatically deactivate upon or during such an occurrence.

Figure 3:
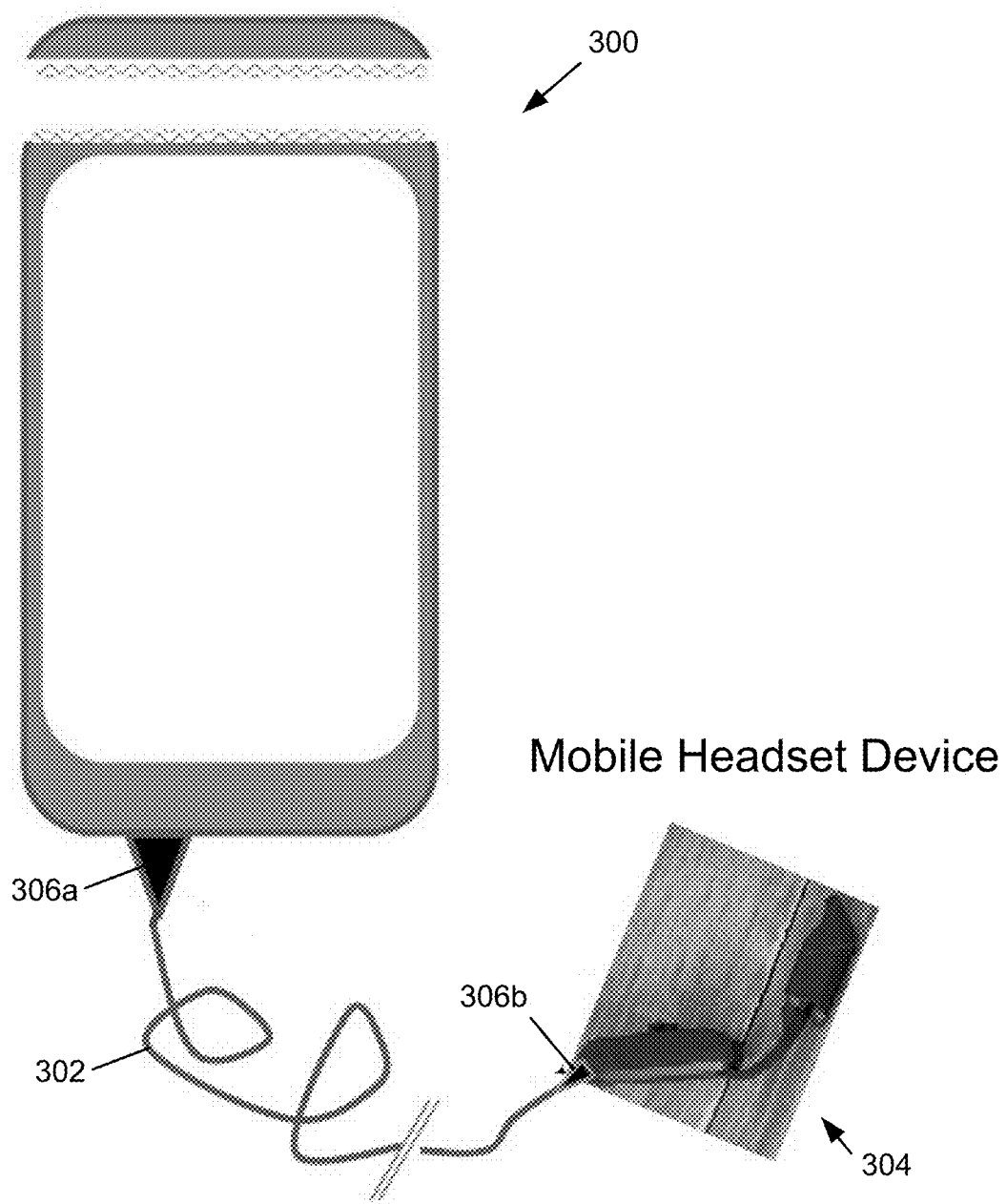
FIG. 3 shows a completely enclosed mobile system according to an embodiment of the invention.

Another embodiment of the mobile device case may be a sealed system case 300, as shown in FIG. 3. The sealed system case 300 may be a combination hard outer body and silicone interior case 200 as described with respect to FIGS. 2A through 2G, and further including an integrated cable 302 connecting the mobile device to a second communications device rather than providing an electrical connection through an external connector. The case 300 may be configured to conform to the size, shape, constituent components and constituent functionality of the particular mobile device. In the example shown in FIG. 3, the second communications device is a mobile headset device 304. As described below, the mobile headset device 304 may also be configured as a sealed system.

Standards exist for the design of electrical equipment intended to be exposed to potentially-explosive environments. For example, ATEX refers to certain European directives concerning equipment and protective systems to be used in potentially explosive environments. Intrinsically Safe (i-Safe or I.S.) standards refer to various regulations and requirements related to products to be used in a potentially explosive environment. As used herein, an "explosive-safe" case refers to a case designed to meet or exceed requirements necessary for ATEX certification, i-Safe certification or other such explosive environment certifications known in the art.

To achieve an explosive-safe certification, a mobile device slips into the sealed system case 300 as shown in FIG. 3. The case 300 is ruggedized, through the design and the selection of constituent materials, to reduce the likelihood that the case 300 will not crack or otherwise experience a loss of integrity if dropped or customarily abused in standard use. The case 300, integrated cable 302 (USB Type C cable in the described embodiment) and mobile headset device 304 (for example as shown and described in related U.S. Application 62/350,378; entitled "Hands-Free Headset For Use With Mobile Communication Device"; filed Jun. 15, 2016) are combined to form a single, hermetically sealed unit. No bare wires, connectors or circuitry is exposed to the potentially-explosive ambient environment. The mobile device, as well as internal batteries, are sealed and are not removable in the field.

In some embodiments, the integrated cable 302 may include a stress strengthening wire or wires configured to resist cable breakage under normal, reasonable use. Some embodiments may further include a strain relief component 306a at the location where the integrated cable 302 connects to the case 300 and a strain relief component 306b at the location where the integrated cable 302 connects to the mobile headset device 304.

As described with respect to FIGS. 2A through 2G, the case 300 may further include a gas inlet/evacuation port. In some embodiments, once the mobile device is deployed into the case 300, a vacuum pump may be used to evacuate air from inside of the case 300 through the port. Once the air has been evacuated, an inert gas may be inserted into the case 300 through the gas inlet/evacuation port, until the pressure inside of the case 300 is somewhat greater than the exterior ambient pressure (i.e., creating a "positive pressure" inside of the case, with respect to exterior ambient pressure). In an explosive external environment, the positive pressure within the case 300 may effectively prevent explosive gases from entering the case 300. For a mobile device, deployed in the case, having altitude sensing capability based on atmospheric pressure, software operating on a processor of the mobile device may identify when the pressure within the case has fallen below a threshold, and as a result cause the mobile device to deactivate. Such software may provide a safety measure in the event that the integrity of the case has been compromised.

In some embodiments for which the mobile device does not have altitude sensing capability, the case 300 may further comprise a pressure sensor to detect the pressure within the case, and to provide a signal, corresponding to the pressure sensed by the pressure sensor, to the mobile device. Software for sensing pressure changes may be used by the mobile device to sense a drop in internal case pressure and disable the device when such a pressure drop is detected, as described above for the altitude-sensing mobile device.

For some embodiments, the mobile headset device 304 may also be configured to maintain a positive interior pressure (i.e., interior to the mobile headset device) with respect to the external ambient pressure. The positive pressure within the mobile headset device 304 may be implemented in a way similar to that described herein with respect to the mobile device case, or by other techniques known in the art. In an example embodiment, the mobile headset device 304 may include a pressure sensor for detecting the interior pressure and producing a signal that corresponds to the detected interior pressure within the mobile headset device. The mobile headset device 304 may include a processor that executes software configured to identify a drop in the interior pressure and disables the electronics of the mobile headset device 304 as a result of the interior pressure drop, similar to the software described with respect to the mobile device case. Alternatively, the headset device 304 may convey the signal from the headset device pressure sensor to the mobile device in the case 300, through the cable 302, and rely on the above-described software operating on the mobile device to detect a pressure drop at the headset device 304 and disable the headset device 304.

In some embodiments, the case 300 and the cable 302 may be configured to share an internal environment, such that the pressure within the internal portion of the case 300 and the pressure within the interior portion of the cable 302 are substantially the same.

In other embodiments, the case 300, the cable 302, and the headset device 304 may all be configured to operate within a common internal environment, such that the pressure within the internal portion of the case 300, the pressure within the interior portion of the cable 302 and the pressure within the interior portion of the headset device are substantially the same.

In such shared internal environment embodiments, an information-conducting medium within the cable 302 may be surrounded by a sheath capable of maintaining a pressure differential between the interior portion of the cable and the exterior environment. If an event occurs that causes the cable to rupture or otherwise compromise the cable's ability to maintain the pressure differential, the resulting drop in the internal pressure may be detected by the software being executed by the mobile device, as described above.

In some embodiments, the sheath of the cable 302 may comprise a material capable of self-repair of damage that may occur to the sheath. In an example embodiment, the sheath may comprise an external layer that provides the primary structural contribution of the sheath, and an internal layer that may be forced by the higher internal pressure into the space caused by a rupture, puncture, tear, or break. Other self-repairing materials and/or arrangements may alternatively be used.

The risk of an electrical spark, resulting from damage to the cable connecting the mobile device case and the headset device, may be mitigated in some embodiments by utilizing a fiber optic cable. Electrical-to-optical (E/O) interface components may be deployed within the mobile device case and the mobile headset device. The E/O interface components may transmit and receive light signals, to and from the cable, through a transparent seal to maintain the pressure integrity within the mobile device case and the mobile headset device.

Figure 4:
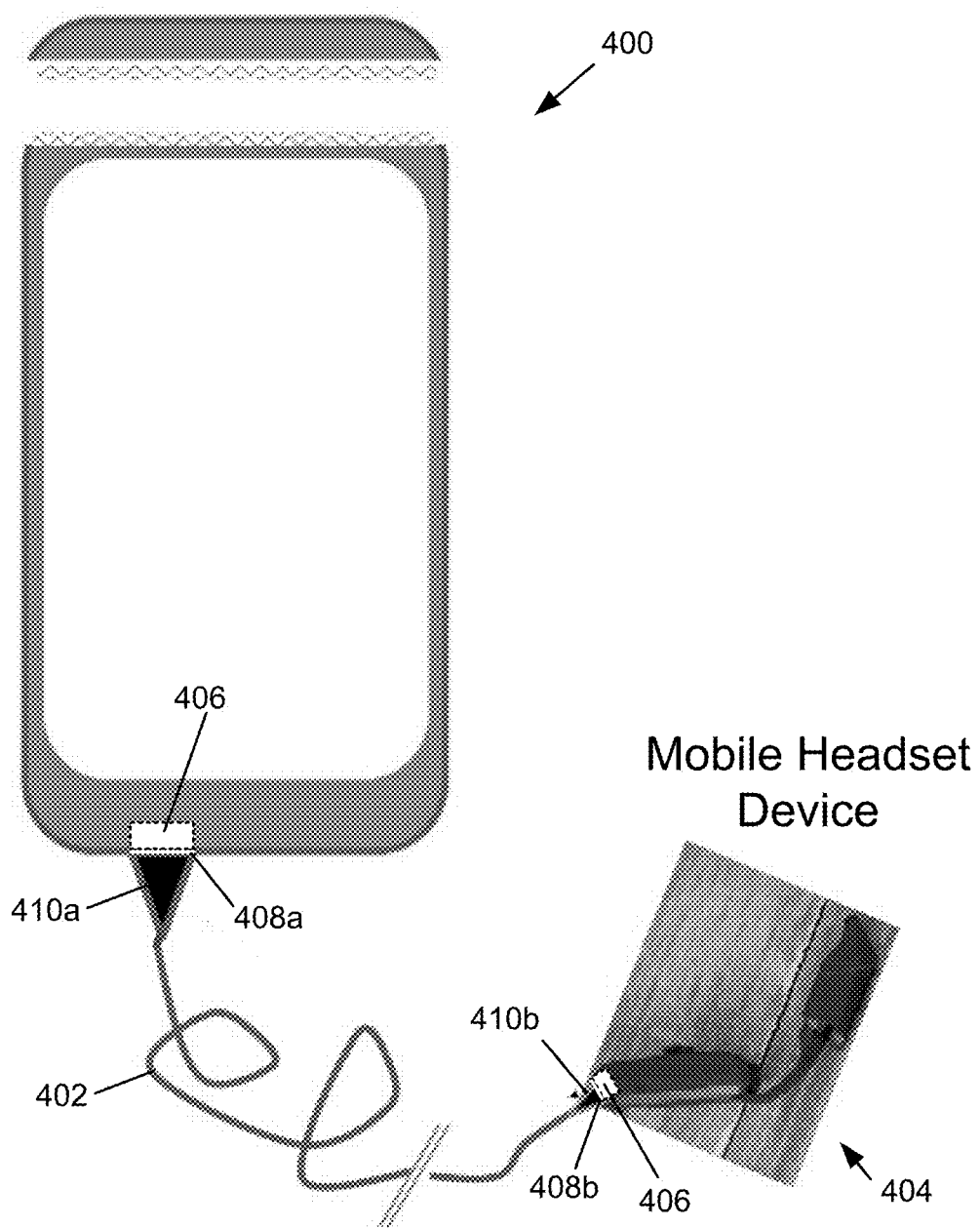
FIG. 4 illustrates an example embodiment of the invention utilizing a fiber optic cable.

The example embodiment depicted by FIG. 4 comprises a case 400, fiber optic cable 402, and a mobile headset device 404. E/O interface components 406 may be deployed within the case 400 and the headset device 404. Transparent seals 408a, 408b, in the case 400 and the headset device 404, provide an air-tight interface between the respective E/O component 406 and the cable 402. A cable terminal 410a, mounted at an end of the fiber optic cable 402, may be attached to the case 400 against the case seal 408a, and cable terminal 410b, mounted at an end of the fiber optic cable 402, may be attached to the mobile headset device 404 against the headset seal 408b. The cable terminals 410a, 410b may be permanently attached to the case and headset, respectively, or they may be formed as an integrated component of the case or headset. To provide a removable attachment, the cable terminals 410a, 410b may be attached to the case and headset, respectively, using one or more securing techniques, including but not limited to magnetic components, elastic bands, elastic clips, plastic latches, fabric hook and loop fasteners, interference fit (i.e., friction fit) systems, or other such attachment mechanisms known in the art.

In one embodiment, the software executing on the mobile device may work in conjunction with one or more accelerometers and/or gyroscopes to detect the free fall of a mobile device in a case. In the event that the device exceed a free fall threshold, and/or the mobile device hits or deflects off of something in the ambient environment with a force or impact that exceeds an impact threshold, the software may cause the mobile device to automatically deactivate upon or during such occurrence.

Figure 5:
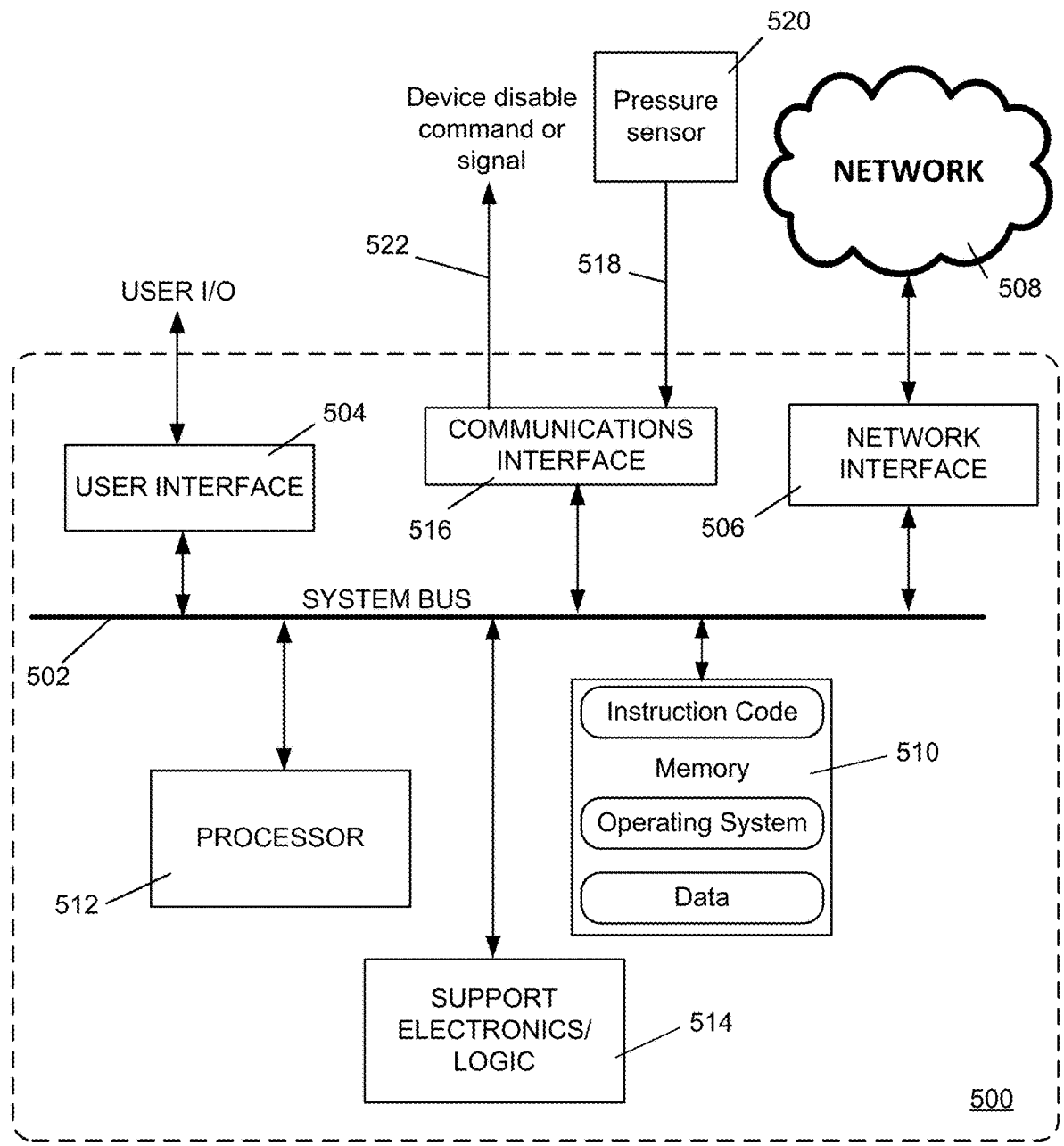
FIG. 5 shows a diagram of an example internal structure of a processing system that may be used to implement one or more of the described embodiments.

FIG. 5 is a diagram of an example internal structure of a processing system 500 that may be used to implement one or more of the embodiments herein. Each processing system 500 contains a system bus 502, where a bus is a set of hardware lines used for data transfer among the components of a computer or processing system. The system bus 502 is essentially a shared conduit that connects different components of a processing system (e.g., processor, disk storage, memory, input/output ports, network ports, etc.) that enables the transfer of information between the components.

Attached to the system bus 502 is a user I/O device interface 504 for connecting various input and output devices (e.g., keyboard, mouse, displays, printers, speakers, etc.) to the processing system 500. A network interface 506 allows the computer to connect to various other devices attached to a network 508. Memory 510 provides volatile and non-volatile storage for information such as computer software instructions used to implement one or more of the embodiments of the present invention described herein, for data generated internally and for data received from sources external to the processing system 500.

A central processor unit 512 is also attached to the system bus 502 and provides for the execution of computer instructions stored in memory 510. The system may also include support electronics/logic 514, and a communications interface 516. The communications interface 516 may receive a pressure measurement signal 518 from a pressure sensor 520, and provide a device disable command or signal 522 to a control facility capable of disabling functions within the mobile device or the headset device.

In one embodiment, the information stored in memory 510 may comprise a computer program product, such that the memory 510 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A mobile device case system, comprising:
a housing configured such that a housing interior is environmentally isolated from a housing exterior, the housing interior configured to accommodate a mobile device comprising a processor, and a memory with computer code instructions stored thereon, the memory operatively coupled to the processor such that, when executed by the processor, the computer code instructions cause the mobile device to:
detect a pressure within the housing interior with a pressure sensor; and
automatically deactivate the mobile device when the detected pressure falls below a pressure threshold;
a feedthrough connector assembly including:
an interior USB Type C connector disposed within the housing; and
an exterior USB Type C connector electrically connected to the interior connector and disposed outside of the housing;
the feedthrough connector assembly configured to environmentally isolate the housing interior from the housing exterior;
a headset device; and
a high-speed USB Type C cable configured to convey information at least one of (i) from the mobile device to the headset device and (ii) from the headset device to the mobile device.

2. The mobile device case system of claim 1, wherein the cable comprises an external sheath, the sheath comprising a material capable of self-repair of damage experienced by the sheath.

3. The mobile device case system of claim 1, wherein the headset device comprises a pressure sensor configured to detect a headset device interior pressure, and the headset device is configured to convey the detected headset device interior pressure to the mobile device, and the headset device automatically directs the headset device to deactivate the headset device when the detected headset device interior pressure falls below the pressure threshold.

4. A mobile device case system, comprising:
a housing configured such that a housing interior is environmentally isolated from a housing exterior, the housing interior configured to accommodate a mobile device;
a feedthrough connector assembly including:
  an interior USB Type C connector disposed within the housing; and
  an exterior USB Type C connector electrically connected to the interior connector and disposed outside of the housing;
  the feedthrough connector assembly configured to environmentally isolate the housing interior from the housing exterior;
a headset device comprising a processor, and a memory with computer code instructions stored thereon, the memory operatively coupled to the processor such that, when executed by the processor, the computer code instructions cause the mobile device to:
detect a pressure within the housing interior with a pressure sensor; and
automatically deactivate the mobile device when the detected pressure falls below a pressure threshold; and
a high-speed USB Type C cable configured to convey information at least one of (i) from the mobile device to the headset device and (ii) from the headset device to the mobile device.

5. A mobile device case system, comprising:
a housing configured such that a housing interior is environmentally isolated from a housing exterior, the housing interior configured to accommodate a mobile device;
a feedthrough connector assembly including:
  an interior USB Type C connector disposed within the housing; and
  an exterior USB Type C connector electrically connected to the interior connector and disposed outside of the housing;
  the feedthrough connector assembly configured to environmentally isolate the housing interior from the housing exterior;
a headset device that shares an internal environment with one or both of the cable and the headset device, and wherein the headset device disposed within the mobile device case comprises a processor, and a memory with computer code instructions stored thereon, the memory operatively coupled to the processor such that, when executed by the processor, the computer code instructions cause the mobile device to:
  detect a pressure within the shared internal environment with a pressure sensor; and
  automatically deactivate the mobile device when the detected pressure falls below a pressure threshold; and
a high-speed USB Type C cable configured to convey information at least one of (i) from the mobile device to the headset device and (ii) from the headset device to the mobile device.

6. A mobile device, comprising:
a housing configured such that a housing interior is environmentally isolated from a housing exterior, the housing interior configured to accommodate a mobile device;
one or more electrical-to-optical (E/O) interface components within the housing interior;
one or more transparent seals in the housing to provide an air-tight interface between the respective E/O interface components and fiber optic cable;
a headset device with E/O interface components; and
a fiber optic cable to transmit optical signals produced by the electrical-to-optical interface at least one of (i) from the mobile device to the headset device and (ii) from the headset device to the mobile device.

* * * * *